May 9, 1939.　　　　C. E. GROSSER　　　　2,157,852
POWER TRANSMISSION
Filed Jan. 8, 1937　　　　4 Sheets-Sheet 1

INVENTOR
CHRISTIAN E. GROSSER
BY
　　　　ATTORNEY

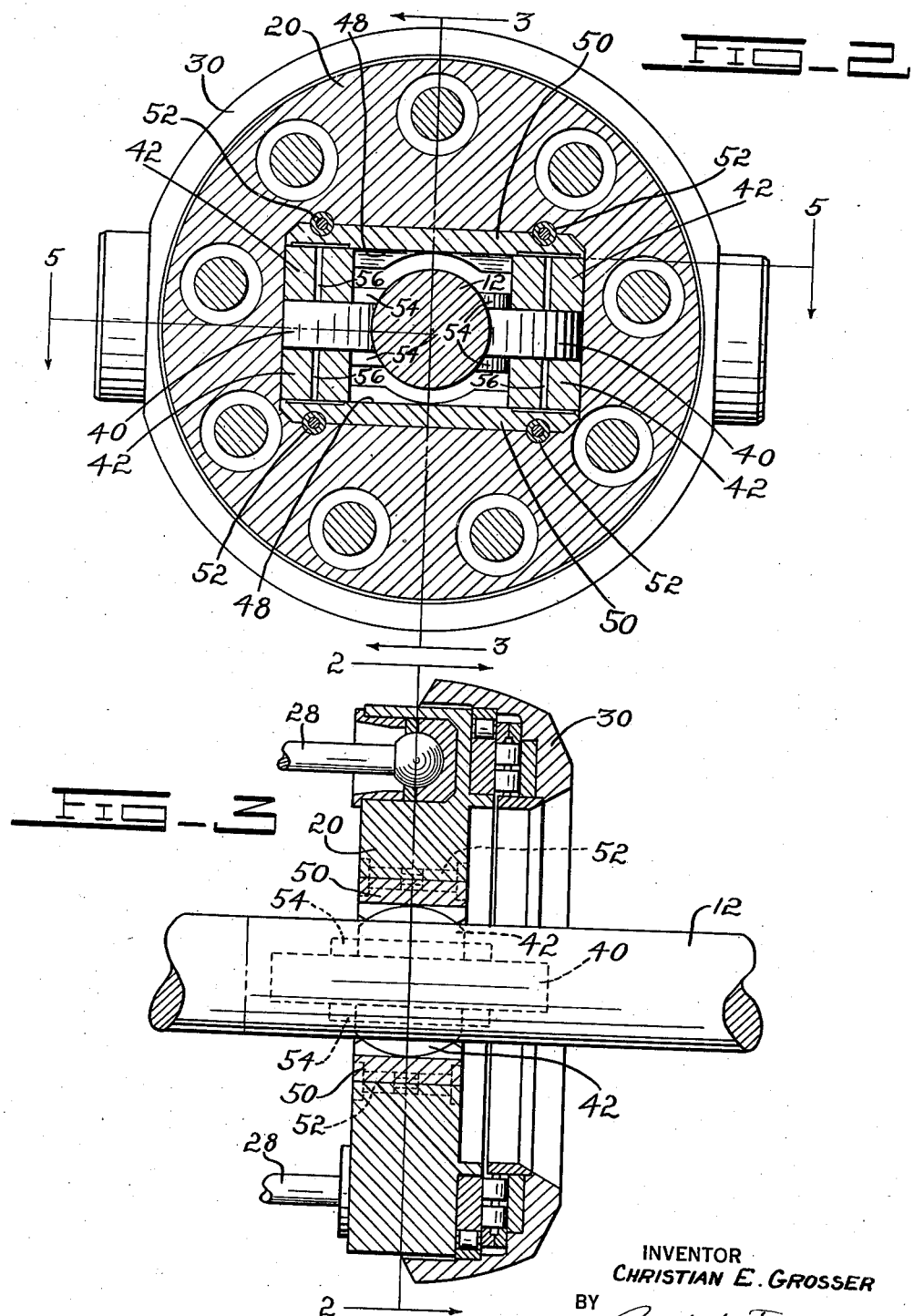

May 9, 1939.　　　C. E. GROSSER　　　2,157,852
POWER TRANSMISSION
Filed Jan. 8, 1937　　　4 Sheets-Sheet 3
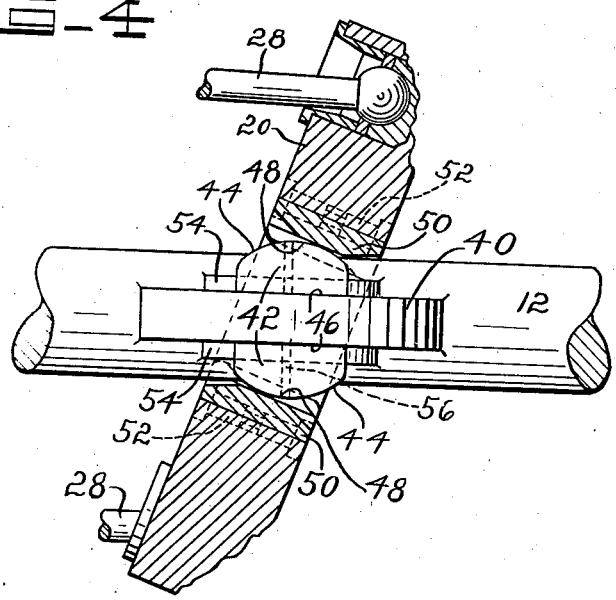
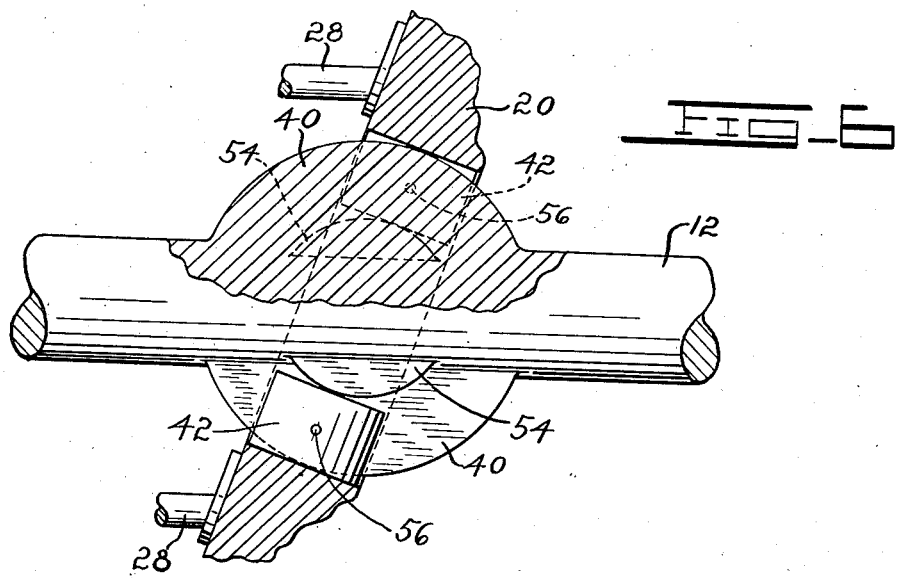
INVENTOR
CHRISTIAN E. GROSSER
BY
ATTORNEY

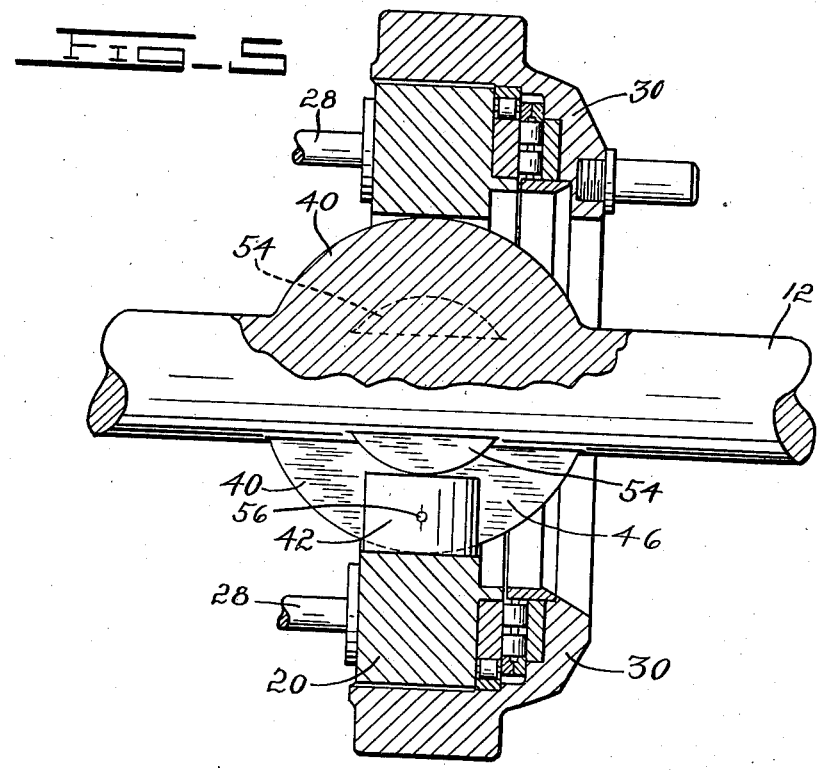

Patented May 9, 1939

2,157,852

UNITED STATES PATENT OFFICE 2,157,852

POWER TRANSMISSION

Christian E. Grosser, Waterbury, Conn., assignor to The Waterbury Tool Company, Waterbury, Conn., a corporation of Connecticut Application January 8, 1937, Serial No. 119,608

4 Claims. (Cl. 64—22)

This invention relates to power transmissions and more particularly to those of the type comprising two or more fluid pressure energy translating devices, one of which may function as a pump and another as a fluid motor. In devices of this type comprising a revolving cylinder block with parallel axial bores and an inclined plate mechanism for causing reciprocation of the pistons, the entire torque load is transmitted between the inclined plate and the drive shaft through a universal joint mechanism. In designing machines of this type it is extremely difficult to obtain sufficient load carrying capacity in a universal joint of the usual type which is small enough to go into the available space.

It is an object of the present invention to provide a novel fluid pressure energy translating device incorporating an improved form of universal joint capable of carrying heavier loads than those heretofore employed while fitting within the same available space.

A further object is to provide in a universal joint of this character an intermediate member in the form of a prism-like member, the cross section of which is substantially a cylindrical segment less than 180° which operates by a cylindrical contact on one member of the joint and a flat contact on the other member, to provide a larger bearing area than has heretofore been possible.

A further feature of the invention resides in the provision of automatic oil film formation on the flat bearing surface.

Further objects and advantages of the present invention will be apparent from the following description, reference being had to the accompanying drawings wherein a preferred form of the present invention is clearly shown.

In the drawings:

Fig. 2 is a cross section on line 2—2 of Fig. 3.

Fig. 3 is a cross section on line 3—3 of Fig. 2.

Fig. 4 is a fragmentary view corresponding to Fig. 3 showing the parts in a second position.

Fig. 5 is a cross section on line 5—5 of Fig. 2.

Fig. 6 is a fragmentary view corresponding to Fig. 5 showing the parts in a third position.

Figure 1:
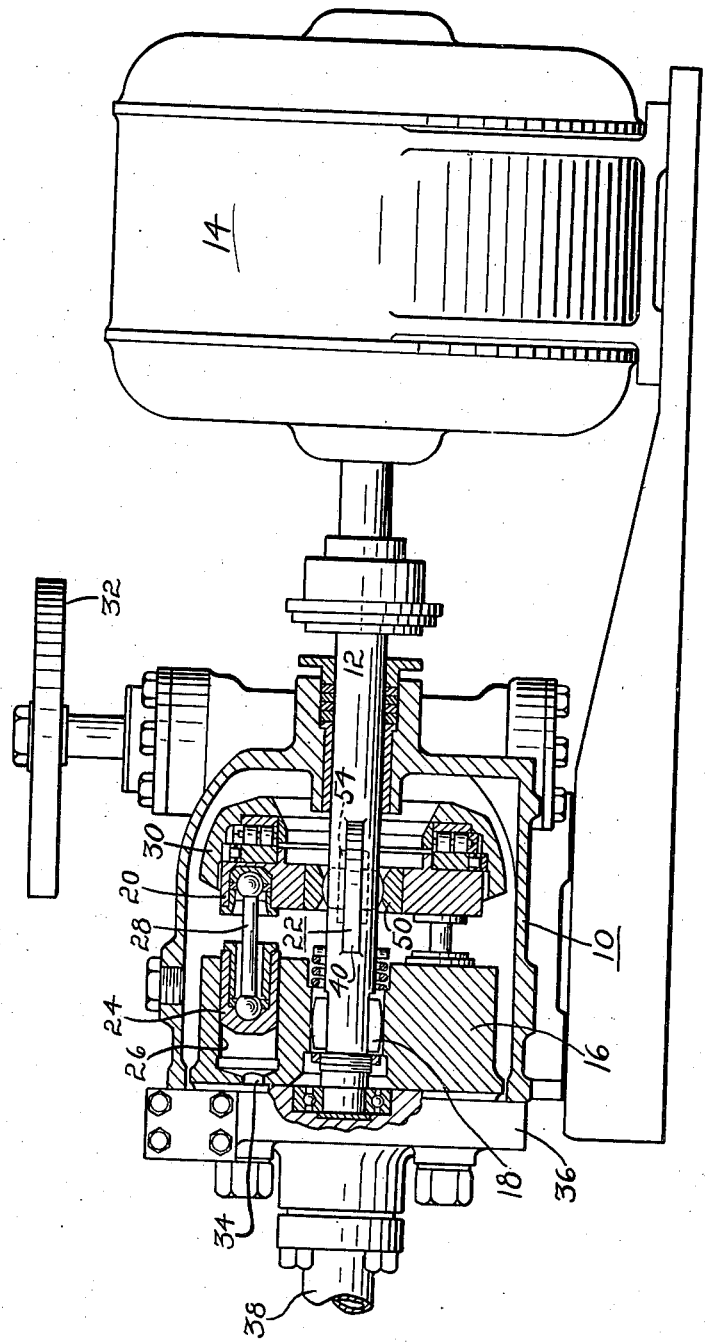
Fig. 1 is a side view partly in section showing a motor driven pump incorporating a preferred form of the present invention.

Referring now to Fig. 1 there is illustrated a variable displacement pump 10 of the well-known "Waterbury" type adapted to form part of a hydraulic power transmission system. The pump 10 has a drive shaft 12 which is driven by an electric motor 14. The shaft 12 drives a cylinder barrel 16 through the medium of keys 18 and drives a socket ring 20 through a universal joint 22. Pistons 24 are reciprocable in bores 26 of the barrel 16 and are articulated by means of connecting rods 28 to the socket ring 20. The latter is rotatably mounted in a tilting box 30 which may be inclined relative to the shaft 12 to varying degrees by a control wheel 32. The bores 26 have cylinder ports 34 which cooperate with a pair of arcuate valve ports, not illustrated, formed in a valve plate 36 and communicating with supply and return conduits 38.

With the tilting box 30 inclined to the shaft 12, rotation of the socket ring 20 and cylinder barrel 16 causes each piston 24 to be forced into its bore 26 during one half of the revolution and withdrawn from the bore during the other half of the revolution. The corresponding port 34 connects to the delivery valve port during the inward stroke of the piston 24 and connects to the suction valve port during the outward stroke of the piston 24, all as is well known in machines of this general character.

The construction of the universal joint 22 is illustrated in detail in Figs. 2 through 6. It will be seen that the shaft 12 is provided with a pair of wing-like lateral extensions 40 which are preferably formed integral with the shaft 12 as by a drop forging operation. The wings 40 have oppositely facing flat bearing surfaces upon which intermediate blocks 42 are free to slide. The blocks 42 are of general prism form having a cylindrical surface 44 and a flat surface 46. The cylindrical surfaces 44 are so formed that when assembled as illustrated in the drawings, the axis of each cylindrical surface lies mid-way between the flat surfaces of the wings 40. Thus, when assembled on the wings 40, two blocks form a nearly complete cylindrical trunnion as will be seen from Fig. 4.

The cylindrical surfaces 44 coact with cylindrical surfaces 48 formed on a pair of insert blocks 50 which are retained in position by suitable fastening means 52. The blocks 50 may be assembled into the socket ring 20 by a movement parallel to the axis of the shaft 12. Adjacent the juncture of the wings 40 with the shaft 12 are provided four partially cylindrical bosses 54 against which the end surfaces of the blocks 42 may ride to prevent inward movement of the blocks toward the shaft axis.

It will be seen that the socket ring is free to tilt on the cylindrical surfaces 44 of the blocks 42 as illustrated by Figs. 3 and 4, the cylindrical surfaces 44 and 48 forming a radially loaded trunnion bearing. The socket ring and blocks 42 are together free to rotate as seen from Figs. 5 and 6 about the axis indicated by the line 3—3 in Fig. 2 which is at right angles to the axis of the cylindrical surfaces 44. During this movement the flat surfaces 46 of the blocks 42 slide along the flat surfaces of the wings 40. The areas of the two sets of bearing surfaces when projected on a plane perpendicular to the line of action of the applied load are substantially equal and coextensive so that the two bearings are substantially equally loaded. It will also be noted that the construction of the blocks 42 provides an automatic wedge oil film formation due to the fact that the force applied by the frictional drag along the flat surfaces 46 is in the direction tending to tilt the block slightly about the axis of the surface 44 so as to open up the film space between the surface 46 and the wing 40 at the entering edge. Thus, the lubrication of the flat surfaces 46 is assured. The blocks 42 may be also provided with lubrication holes 56 extending from the flat surfaces 46 to the cylindrical surfaces 44. Thus, a part of the oil which is forced between the blocks 42 and the wings 40 by this wedge action is delivered to the cylindrical surfaces 44.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device of the type having an inclined plate, a drive shaft, and a universal joint connected therebetween the combination of a pair of laterally extending wings formed on the shaft having oppositely facing flat surfaces, segmental blocks slidable on the flat surfaces of each wing and arranged to have their outer surfaces lie in a common cylindrical surface, cylindrical recesses formed in the inclined plate for receiving said segmental blocks, and means forming a lubricant passage through each block from its flat surface to its cylindrical surface, said blocks being segments of less than a half cylinder whereby drag along their flat surfaces causes the blocks to tilt and form a wedge of lubricant under pressure for transmittal to the cylindrical surfaces.

2. In a fluid pressure energy translating device of the type having an inclined plate, a drive shaft, and a universal joint connecting the shaft and the plate, the combination of a pair of coaxial cylindrically shaped trunnion bearings about the axis of which the ring may tilt relative to the shaft, and a pair of flat bearings partaking of sliding movement so that the ring may tilt about a second axis perpendicular to the first-mentioned axis, and means for positively feeding lubricant to the cylindrical bearings under pressure self-generated in the flat bearing.

3. In a fluid pressure energy translating device of the type having an inclined plate, a drive shaft, and a universal joint connecting the shaft and the plate, the combination of two sets of bearings having pivoting axes at right angles to each other, one set of bearings being loaded radially of its pivoting axis and the other set being loaded axially, said bearings having substantially equal and coextensive projected areas upon a plane perpendicular to a line connecting their load centers, and means for positively feeding lubricant to one set of bearings under pressure generated in the other set.

4. An intermediate member for a universal joint comprising a generally prism-shaped block having a flat surface and a surface forming a portion, less than half, of a cylinder, said member being adapted for assembly between a driving member and a driven member so that its cylindrical surface forms part of a journal bearing on one member and its flat surface partakes of sliding movement on the other member perpendicular to the prism axis whereby the frictional drag along the flat surface tends to cause the intermediate member to tilt in a direction for wedge oil film formation, and an oil passage connecting between the flat surface and the cylindrical surface whereby pressure generated in the wedge oil film is transmitted to the cylindrical surface.

CHRISTIAN E. GROSSER.